United States Patent
Mao

(10) Patent No.: US 7,586,928 B2
(45) Date of Patent: Sep. 8, 2009

(54) PROCESS AND DEVICE FOR DETERMINISTIC TRANSMISSION OF ASYNCHRONOUS DATA IN PACKETS

(75) Inventor: Jean-Pierre Mao, Pibrac (FR)

(73) Assignee: Airbus France, Toulouse Cedex (FR)

( * ) Notice: Subject to any disclaimer, the term of this patent is extended or adjusted under 35 U.S.C. 154(b) by 901 days.

(21) Appl. No.: 09/988,527

(22) Filed: Nov. 20, 2001

(65) Prior Publication Data

US 2002/0105958 A1 Aug. 8, 2002

(30) Foreign Application Priority Data

Dec. 12, 2000 (FR) .................................. 00 16146

(51) Int. Cl.
H04L 12/56 (2006.01)
G08B 21/00 (2006.01)
H04J 3/00 (2006.01)

(52) U.S. Cl. ................ 370/412; 370/473; 370/476; 340/945

(58) Field of Classification Search ................ 370/394, 370/395.6, 473, 474, 476
See application file for complete search history.

(56) References Cited

U.S. PATENT DOCUMENTS

| | | | | |
|---|---|---|---|---|
| 5,077,671 A * | 12/1991 | Leslie et al. | ................ | 701/3 |
| 5,303,302 A * | 4/1994 | Burrows | ................ | 713/161 |
| 5,327,421 A * | 7/1994 | Hiller et al. | ................ | 370/395.61 |
| 5,509,007 A * | 4/1996 | Takashima et al. | ................ | 370/391 |
| 5,606,559 A | 2/1997 | Badger et al. | | |
| 5,732,082 A * | 3/1998 | Wartski et al. | ................ | 370/395.6 |
| 5,740,173 A * | 4/1998 | Fiorini | ................ | 370/394 |
| 5,844,906 A * | 12/1998 | Khelghatti et al. | ................ | 370/474 |
| 6,014,381 A * | 1/2000 | Troxel et al. | ................ | 370/395.52 |
| 6,075,798 A * | 6/2000 | Lyons et al. | ................ | 370/474 |
| 6,430,184 B1 * | 8/2002 | Robins et al. | ................ | 370/392 |
| 6,526,046 B1 * | 2/2003 | Carew | ................ | 370/352 |
| 6,704,315 B1 * | 3/2004 | Besset-Bathias | ................ | 370/395.4 |
| 6,707,819 B1 * | 3/2004 | Fraser et al. | ................ | 370/395.1 |
| 6,717,955 B1 * | 4/2004 | Holler | ................ | 370/474 |
| 7,031,343 B1 * | 4/2006 | Kuo et al. | ................ | 370/473 |
| 2001/0043614 A1 * | 11/2001 | Viswanadham et al. | ................ | 370/469 |
| 2002/0018474 A1 * | 2/2002 | Assa et al. | ................ | 370/395.71 |
| 2002/0027919 A1 * | 3/2002 | Eneroth et al. | ................ | 370/395.1 |
| 2003/0118016 A1 * | 6/2003 | Kalkunte et al. | ................ | 370/389 |
| 2004/0114600 A1 * | 6/2004 | Mao | ................ | 370/395.1 |
| 2004/0208179 A1 * | 10/2004 | Mao | ................ | 370/394 |
| 2008/0144617 A1 * | 6/2008 | Molsberry et al. | ................ | 370/389 |

FOREIGN PATENT DOCUMENTS

WO WO 98/51114 11/1998

* cited by examiner

*Primary Examiner*—Gregory B Sefcheck
(74) *Attorney, Agent, or Firm*—Nixon Peabody LLP

(57) ABSTRACT

A deterministic transmission process for asynchronous data in packets stores data arriving in an asynchronous manner in registers as and when it arrives. The data is sent to one of several packeting modules, which conduct start of packeting, packeting with sorting and enhancement of data, end of the packeting, and sending of the made-up or assembled packets to a message composition module at the request of the message composition module during the realization cycle of the packet, so that a new realization cycle is commenced. The packets are recovered one after another, in a predefined order, in the message composition module. The message thus composed is set in the electrical format in the protocol used for transmission.

3 Claims, 3 Drawing Sheets

PROCESS AND DEVICE FOR DETERMINISTIC TRANSMISSION OF ASYNCHRONOUS DATA IN PACKETS

TECHNICAL FIELD

The present invention relates to a process and device for deterministic transmission of asynchronous data in packets.

STATUS OF THE PREVIOUS TECHNIQUE

In devices of the prior art for deterministic transmission of asynchronous data in packets, the acquisition device and data acquired by this device are asynchronous. Data packeting is conducted according to an inherent sequencing. A packet corresponds to one or several acquired data processed with or without wrapping, the wrapping being made up of a heading and an end. The number of data transmitted in the output message corresponding to a packet is defined according to two criteria:

the number of data is restricted:
  it is always the same, or
  the maximum is specified
the distribution of data may or may not be positioned temporally in an equally-timed manner.

In the first example of data transmission from a packet i in the output message, as illustrated in FIG. 1, the number of data Mi is always the same, and distributed in an equally-timed manner (Ti equal delays).

In the second example of data transmission from a packet i in the output message, as illustrated in FIG. 2, the maximum number of data Mi is always the same, it is MxTxi over an identified period of time Txi, and distributed in an unequally-timed manner (Txi variable delays)—that is, MxTxi varies at each Txi, with MxTxi≦Mi.

In the field of data acquisition and telemetry of flight testing installations, the numerical or digital data, conveyed on continuous and cyclic messages, issued by acquisition and processing systems of the prior art is stored in the FIFO (First in-First out) registers as and when it arrives. The data arrives in a totally asynchronous manner.

A module for packeting facilitates placing certain data from these FIFO registers according to a predefined order. It also facilitates enhancing this data with elements of the relative date calculation type, data identification, and formatting of data, etc. A packet thus obtained is therefore a group of data with a precise format and containing data in a precise order.

A module for packeting operates according to the following succession of stages:

1) reception of data contained in the FIFO registers (dump),
2) start of packeting,
3) packeting, with sorting and data enhancement,
4) end of packeting,
5) sending of the assembled packet to a message composition module.

The message composition module recovers, one after the other, the assembled packets created by the packeting modules. A message is then composed using successive assembled packets in a predefined order.

A formatting module then facilitates setting the message into the proper protocol used for transmission.

The operating cycle of the packeting module is self-sustaining. When the message composition module needs a packet, it sends a request to the packeting module which transmits the packet if it is made up, i.e. if stage 4 is finished. If not, it sends nothing or else an empty packet so as not to block the message composition module. The data is transmitted via the various stages 1 to 5—the data arrives, it is assembled into packets by a self-sustaining device which has its own life cycle, as it is only transferred in the message if the packet is ready. It is even possible that the message can contain no data, simply because the packeting has not been finished.

In these devices of the prior art, the data conveyed on the messages is at fixed slots in time. They are PCM (Pulse Coded Modulation) type messages which meet the IRIG106 standard. The formalism of packeting, as a packet can be made up of one datum, is standardized. On the other hand, this standard stipulates nothing on the transmission time of the packets. It is the same for the CE83 and CCSDS standards.

As illustrated in FIG. 3, the data and transmission in the output message are asynchronous, the transmission time TT therefore varies between the time of packeting TP and a duration 2*TP equal to twice this time, as the transmission time in the output message TMS is such that TMS<<TP.

One object of the invention is to mitigate the disadvantages of devices of the prior art, by enabling:

transmission of the maximum amount of data in the output message,
controlling transmission time of the acquired data,
realizing the greatest possible ratio for the number of acquired/wrapped data in the packet.

SUMMARY OF THE INVENTION

The invention relates to a process of deterministic transmission of asynchronous data in packets, in which data arriving asynchronously is stored in registers as and when it arrives, the said process, for example, comprising the following stages:

reception of data contained in a set of registers in one of several packeting modules; start of packeting or packet assembly; packeting with sorting and enhancement of data; end of packeting; and sending of the packet assembled in this matter,
terminating packet assembly in the course of realization in a packeting module when a message composition module needs the packet; transmission of the packet assembled; and start of the realization cycle of a new packet,
recovery, one after another, of packets thus created in a predefined order in the message composition module,
setting the message, compiled in the message composition module, in the proper protocol used for transmission.

In accordance with this process, a packeting module which is no longer self-sustained therefore is used. As soon as the message composition module requests a packet, it receives the packet since it is this composition module that controls the packeting cycle.

In contrast to devices of the prior art in which the messages are only compiled with "well finished" packets (with the risk of having empty packets), in the process of the invention each message may carry packets perhaps "less well finished," but all the data which can be, is transmitted as soon as transmission is requested. The timing cycle of datum between input and output of a device implementing this inventive process is therefore controlled.

The invention also relates to a device of deterministic transmission of asynchronous data in packets comprising:

at the least one input module receiving the input data,
registers receiving numerical data stemming from this input module, several packeting modules each connected to at least one register, at least one control module for register dump monitored by at least one packeting module, a message composition module receiving the outputs of all the packeting modules, which can send an order of end of packet assembly to each packeting module, a module for formatting packets, an output module capable of issuing each made-up packet on a transmission line.

The process and the device of the invention can be used notably in data acquisition and real-time processing systems for test installations for new airplanes. The solution proposed in the invention for such systems offers the following advantages. To follow vibration (or flutter) tests which are very dangerous for a plane, it is essential to perfectly control the transmission time TT, as the useful acquired data must be given to a specialist with a delay TT either less than 100 ms, or parameterized depending on the type of test. With the solution stipulated in the invention TT=TP, while in the devices of prior art TP<TT<_2*TP on the assumption that TMS<<TP. The objectives are therefore optimized with the solution of the invention. In fact, at fixed TT, TP is greater with the recommended solution than with the solution of devices of the prior art.

SHORT DESCRIPTION OF THE DRAWINGS

SUMMARY OF REALIZATION METHODS

A process of deterministic transmission of asynchronous data in packets in accordance with the invention in which data arriving asynchronously is stored in FIFO registers as and when it arrives, includes the following stages:

reception of data contained in the registers, start of packeting or packet assembly, packeting with sorting and enhancement of data, end of packeting, sending of the packet to a message composition module which recovers the packets created one after another, in a predefined order, and, when this message composition module needs a packet:

terminating packet assembly in the course of realization, transmission of the packet thus assembled, start of the realization cycle of a new packet.

Figure 1:
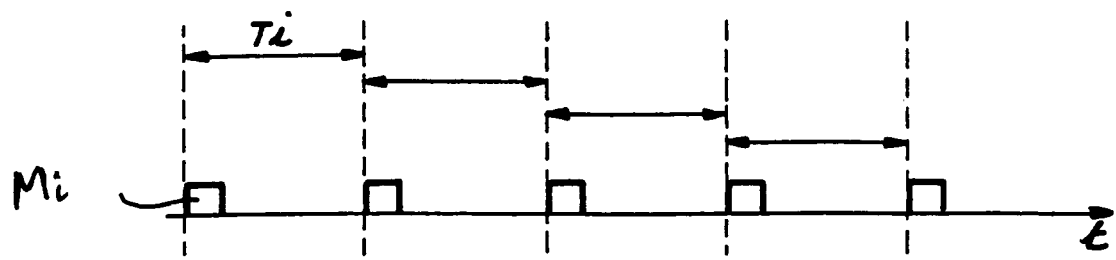
FIGS. 1 and 2 illustrate two examples of transmission of data from a packet, in a device of the prior art.
Figure 2:
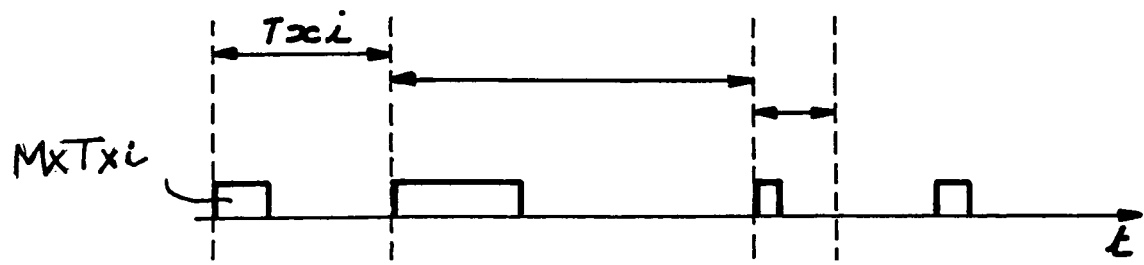
Figure 3:
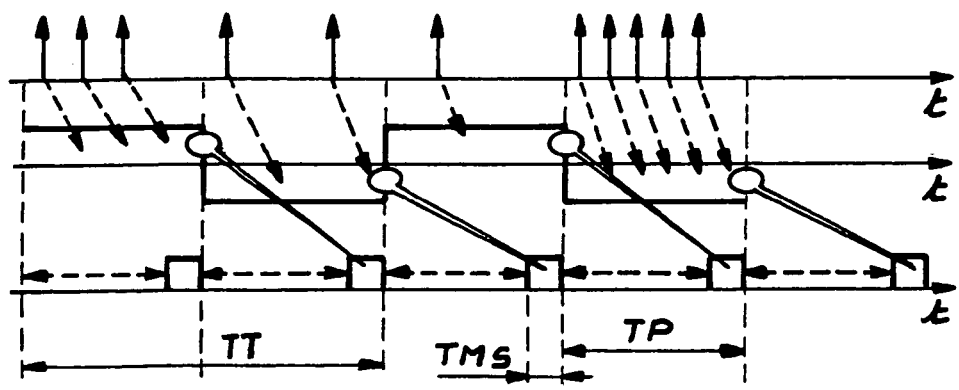
FIG. 3 illustrates an example of operation of a device of the prior art.
Figure 4:
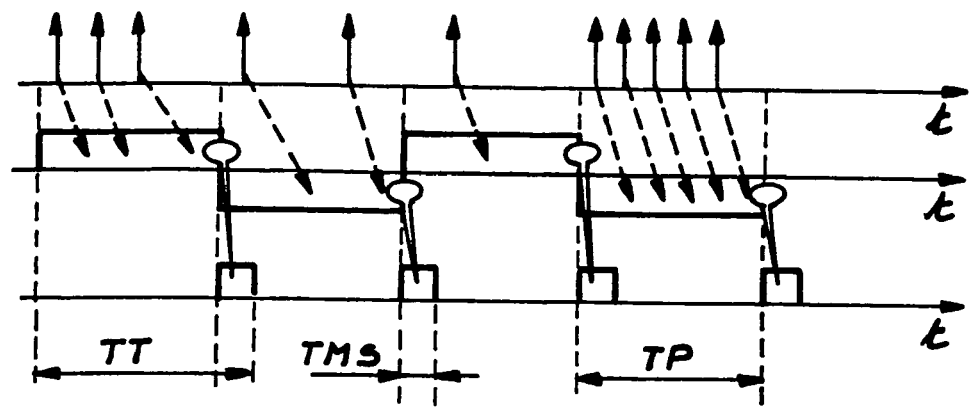
FIG. 4 illustrates the operation of a process in accordance with the invention.

As illustrated in FIG. 4, the process of the invention consists in synchronizing the start and end of packet make-up, or assembly, in relation to their transmission in the output message—TMS being the transmission time in the output message, TP the packeting time and TT the transmission time with TT=TP+TMS. The solution obtained with TP>>TMS advantageously meets the above-specified objectives.

For an identified packet, the packeting limits the number of acquired data to a value x. If during the time TP, there are x+m data to be packeted, m data is then lost.

Figure 5:
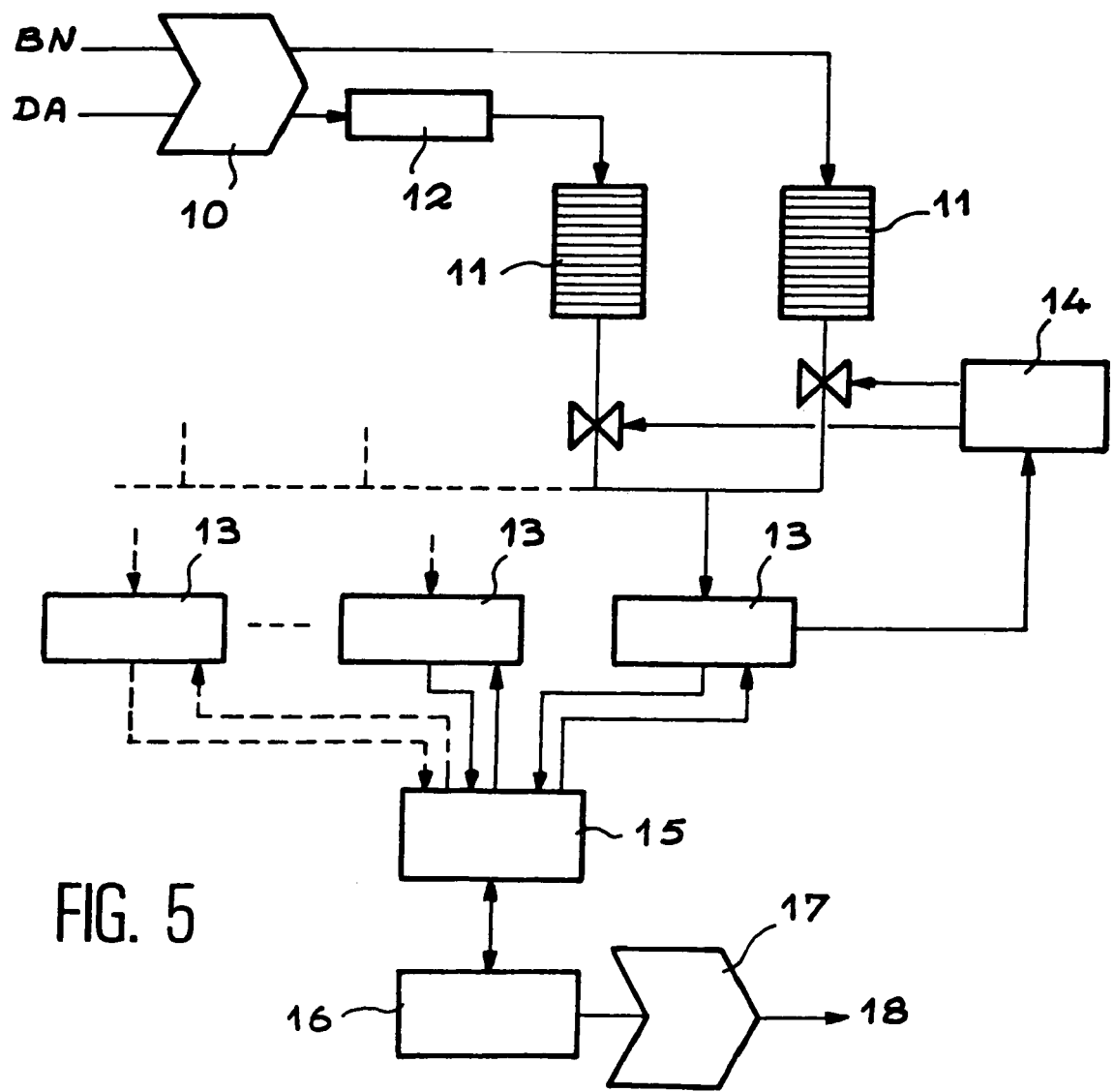
FIG. 5 illustrates a device in accordance with the invention.

The device of the invention, illustrated in FIG. 5, comprises:

at least one input module 10 receiving input data, for example a digital bus BN and analog data DA, at least a set of registers 11 receiving digital data from the input module, possibly through an analog/digital converter 12, connected to at least one packeting module 13, at the least one control module for register dump 14 monitored by at least one packeting module 13, a message composition module 15 receiving the outputs of all the packeting modules 13, which can send an order of end of packet make-up or assembly to each one of the packeting modules, a module for formatting packets 16, an output module 17 capable of issuing each made-up packet on a transmission line 18.

In the device of the invention, the digital or digitized data is stored in the FIFO registers 11 as and when it arrives. The data arrives in a totally asynchronous manner, and seen from the device, its arrival is random.

The role of each packeting module 13 is to place certain data from the registers 11 according to a predefined order. It can also enhance this data with elements of the relative date calculation type, data identification and formatting of the data. A packet is therefore a group of data with a precise format and containing data in a precise order.

As described previously, each packeting module 13 operates according to the following cycle:

1) reception of the data contained in the registers, 2) start of the packeting, 3) packeting with sorting and enhancement of the data, 4) end of the packeting, 5) sending of the packet to the message composition module.

One difference between the device of the invention and devices of the prior art is the way in which each task 1 to 5 is triggered.

The message composition module 15 recovers the packets created by the successive packeting modules 13 one after the other in a predefined order.

The operating cycle of the module 13 is not self-sustaining. When the message composition module 15 needs a packet, it sends the packet request to the packeting module 13. This stops makeup or assembly of the packet in the course of realization. The packeting module 13 transmits the packet thus made up or assembled, then starts the realization cycle of a new packet.

The formatting module 16 is responsible for setting the message 15 in electrical format in the protocol used for the transmission (recognized function and realization).

Figure 6:
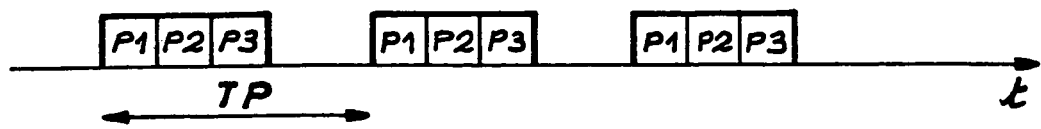
FIG. 6 illustrates an example of operation of a device in accordance with the invention illustrated in FIG. 5.

In an example of operation, the device of the invention comprises three packeting modules 13. The make-up of packets that they generate (P1, P2 and P3 respectively) is unimportant (data sorting, enhancing, etc.). As illustrated in FIG. 6, a message is made up of the succession of three packets—P1 followed by P2 followed by P3—which are transmitted by the message composition module 15 to the formatting module 16, TP being the packeting time. In this example wrapping elements are not taken into consideration (start of frame, end of frame, checksum, etc.) realized by the formatting module 16.

Figure 7:
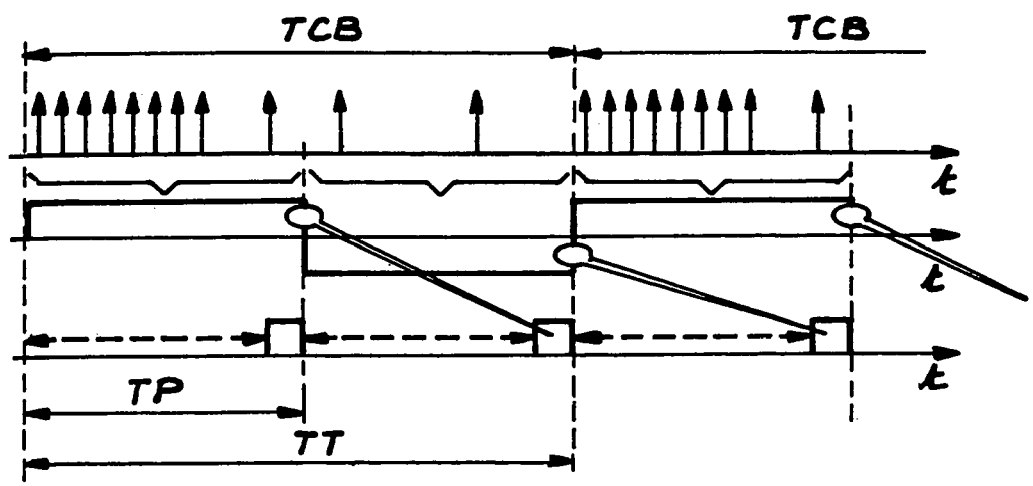
FIGS. 7 and 8 illustrate an example of realization for an acquisition of arinc429 bus using respectively a device of the prior art and the device in accordance with the invention.
Figure 8:
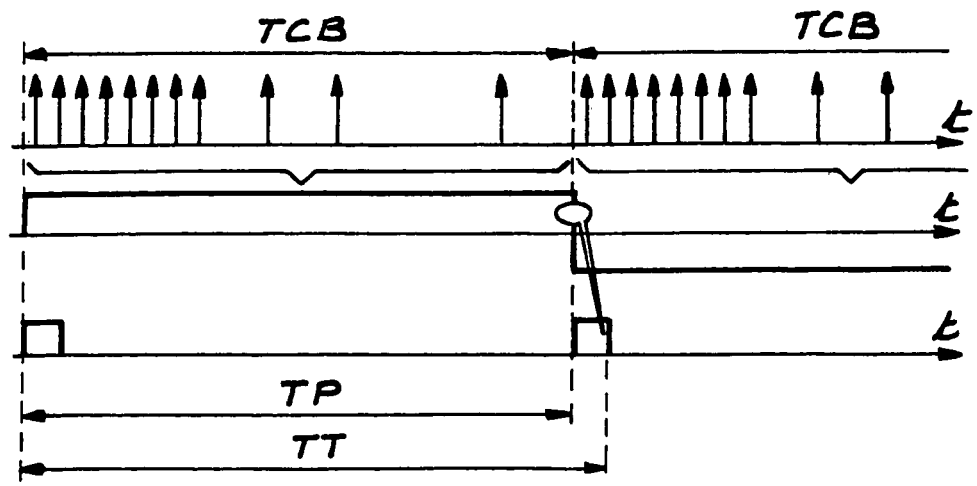

At present an example of realization will be considered which is an acquisition of arinc429 bus on the assumption that TMS<<TP, TCB being the bus cycle time, the number of data always being the same, and distributed in an equally-timed manner:

FIG. 7 illustrates operation of a device of the prior art,

FIG. 8 illustrates operation of the device of the invention as described above.

Advantages of the solution proposed by the invention as compared with devices of the prior art are shown in Table 1 at the end of the description. The device of the invention meets the objectives defined previously and reveals a very significant gain as compared with the devices of the prior art.

TABLE 1

| Output message for the time window TT | Device of the prior art | Device of the invention | Device of the prior art - Device of the invention/Device of the invention => gain |
|---|---|---|---|
| Number of data | 18 | 11 | 64% |
| Number of wrappings | 2 | 1 | 100% |

The invention claimed is:

1. A process for deterministic transmission of asynchronous data in packets issued by acquisition and processing systems, in the field of data acquisition and telemetry of flight testing installations, comprising the following steps:

storing numerical or digital telemetry data of the flight testing installation, conveyed on continuous and cyclic messages, issued by acquisition and processing systems which arrives in a totally asynchronous manner in FIFO registers, packeting data from said FIFO registers in a first set of packets, in a first packeting cycle, according to a predetermined order with sorting and enhancement of these data, in multiple, non-selfsustained packeting modules, receiving a request from the message composition module to the packeting modules when the message composition module needs a data packet;

after sending of a request by the message composition module, which controls the packeting cycles, ending said first packeting cycle in said packeting modules, forwarding said first set of packets, regardless the state of completion of the first packeting cycle, to said message composition module, beginning a second packeting cycle for a second set of packets, recovering said first set of packets by the message composition module, one packet after the other in a predefined order, to form a first message, setting the first message in electrical format, in a formatting module, in a protocol used for the transmission to form an output message, outputting said output message, by the output module on a transmission line, said method allowing synchronization of the start and end of packets in relation to their transmission in the output message, the timing cycle of data between the storing step and the outputting step being therefore controlled.

2. The process of claim 1, further comprising conducting data acquisition and real-time processing for flight test installations of new airplanes.

3. A device for deterministic transmission of asynchronous data in packets issued by acquisition and processing systems, in the field of data acquisition and telemetry of testing installations, said device comprising:

at least one input module receiving asynchronous telemetry data of a flight testing installation, a plurality FIFO registers configured to receive data from the at least one input module;

a plurality of non-selfsustaining packeting modules connected to said FIFO registers, at least one control module for FIFO register dump, monitored by at least one packeting module of said plurality of packeting modules, a message composition module, which controls the packeting cycles, receiving the outputs of all packeting modules for composing a message therefrom, said message composition module configured to control the packeting cycle in sending to each of said plurality of packeting modules an order to terminate a packet assembly procedure regardless of whether said packet assembly procedure is completed, said order being a request received from the message composition module to the packeting modules when the message composition module needs a data packet;

a packet formatting module configured to format said message from said message composition module, and an output module configured to transmit said message on a transmission line, the timing cycle of data between the input module and the output module being therefore controlled.

* * * * *

UNITED STATES PATENT AND TRADEMARK OFFICE
CERTIFICATE OF CORRECTION

PATENT NO. : 7,586,928 B2  Page 1 of 1
APPLICATION NO. : 09/988527
DATED : September 8, 2009
INVENTOR(S) : Jean-Pierre Mao It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1165 days.

Signed and Sealed this

Twenty-first Day of September, 2010

David J. Kappos
*Director of the United States Patent and Trademark Office*